(12) United States Patent (10) Patent No.: US 7,453,685 B2
Lube (45) Date of Patent: Nov. 18, 2008

(54) MOUNTABLE FRAME FOR HOLDING FLAT PANEL DISPLAY AND METHODS OF MOUNTING FRAME FOR HOLDING FLAT PANEL DISPLAY

(75) Inventor: Robert R. Lube, Countryside, IL (US)

(73) Assignee: Wells Gardner Electronics Corporation, McCook, IL (US)

( * ) Notice: Subject to any disclaimer, the term of this patent is extended or adjusted under 35 U.S.C. 154(b) by 242 days.

(21) Appl. No.: 11/062,111

(22) Filed: Feb. 18, 2005

(65) Prior Publication Data

US 2006/0187624 A1 Aug. 24, 2006

(51) Int. Cl.
G06F 1/16 (2006.01)
(52) U.S. Cl. .................. 361/681; 361/683; 463/46; 463/47; 312/223.2
(58) Field of Classification Search .......... 361/681, 361/679, 683, 724–727; 349/58; 248/201, 248/924; 312/7.2, 223.2; 348/836, 843; 463/46, 47
See application file for complete search history.

(56) References Cited

U.S. PATENT DOCUMENTS

| | | | | |
|---|---|---|---|---|
| 1,870,731 | A * | 8/1932 | Isaacson | 248/201 |
| 3,034,755 | A * | 5/1962 | Pazoureck | 248/201 |
| 3,286,280 | A * | 11/1966 | Duggan | 4/252.2 |
| 3,940,136 | A | 2/1976 | Runte | |
| 4,995,167 | A * | 2/1991 | Sanchez | 33/404 |
| 5,233,502 | A * | 8/1993 | Beatty et al. | 361/681 |
| 5,347,630 | A * | 9/1994 | Ishizawa et al. | 345/538 |
| 5,351,176 | A | 9/1994 | Smith Stephen W. et al. | |
| 5,568,864 | A * | 10/1996 | Nathan | 206/408 |
| 6,135,884 | A | 10/2000 | Hedrick et al. | |
| 6,164,645 | A | 12/2000 | Weiss | |
| 6,179,133 | B1 * | 1/2001 | Reece | 211/26 |
| 6,286,440 | B1 | 9/2001 | Jyringi | |
| 6,368,216 | B1 | 4/2002 | Hedrick et al. | |
| 6,466,283 | B1 * | 10/2002 | Peng | 349/58 |
| 6,475,087 | B1 | 11/2002 | Cole | |
| 6,822,855 | B2 * | 11/2004 | Pressley et al. | 361/681 |
| 6,860,814 | B2 | 3/2005 | Cole | |
| 6,891,581 | B2 * | 5/2005 | Peng | 349/58 |
| 6,900,857 | B2 * | 5/2005 | Mai | 349/58 |
| 7,075,783 | B2 * | 7/2006 | Jeong et al. | 361/681 |
| 7,095,608 | B2 * | 8/2006 | Simmons et al. | 361/681 |
| 7,319,499 | B2 * | 1/2008 | Peng | 349/58 |
| 2002/0109802 | A1* | 8/2002 | Cheng et al. | 349/58 |
| 2004/0018870 | A1* | 1/2004 | Cole | 463/20 |
| 2004/0120104 | A1* | 6/2004 | Jeong et al. | 361/681 |
| 2006/0227499 | A1* | 10/2006 | Jeong et al. | 361/681 |

* cited by examiner

*Primary Examiner*—Jayprakash N Gandhi
*Assistant Examiner*—Anthony Q Edwards
(74) *Attorney, Agent, or Firm*—Townsend and Townsend and Crew LLP

(57) ABSTRACT

Frames suitable for mounting flat panel displays are provided. The frame is adapted to engage and secure a flat panel display. One or more flanges on at least one side of the frame are adapted to attach to sides of an opening within a console. Also provided are methods for mounting a flat panel display in a frame and mounting the display and frame assembly within a console.

7 Claims, 3 Drawing Sheets

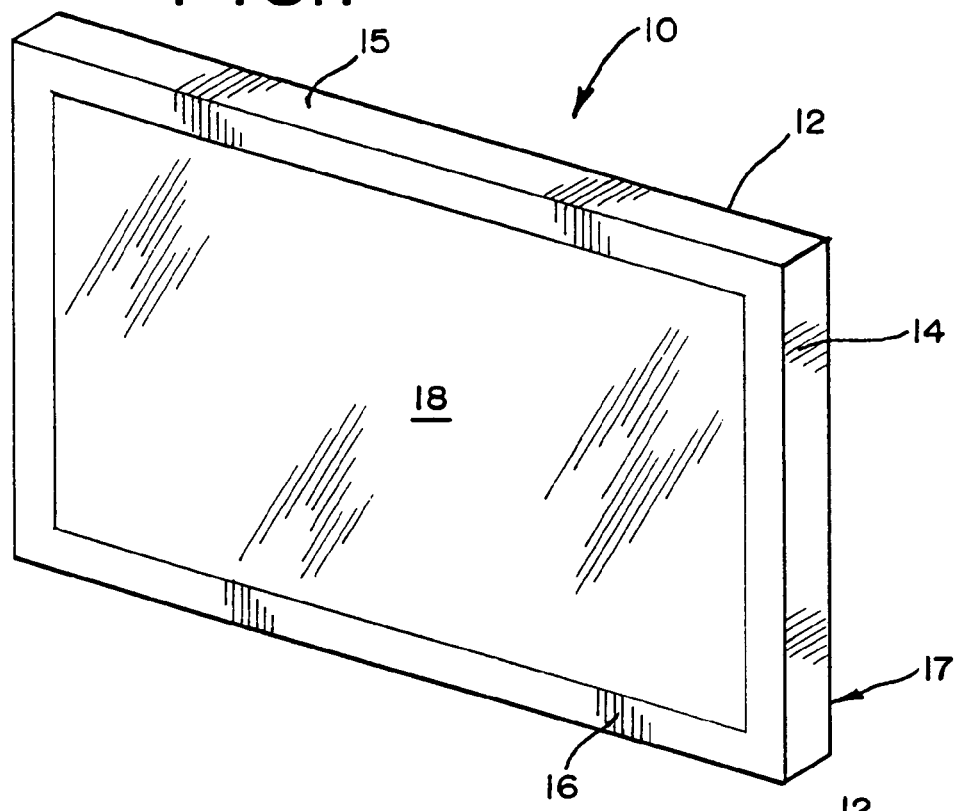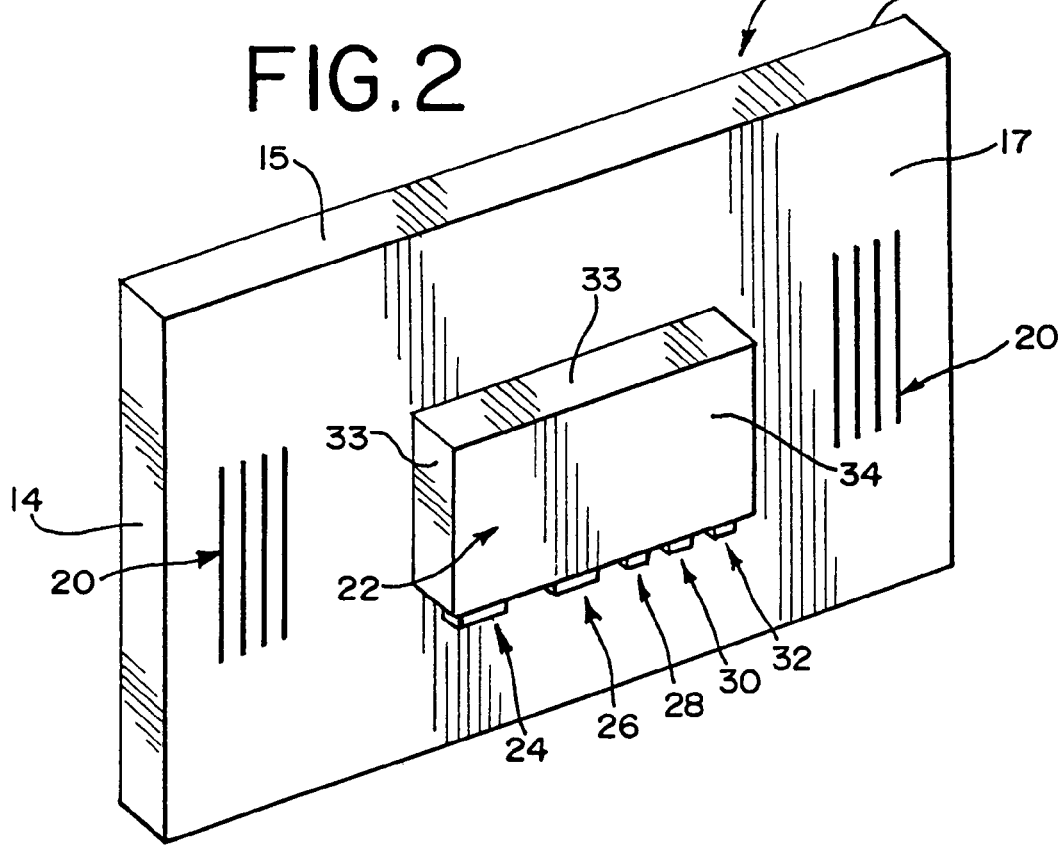

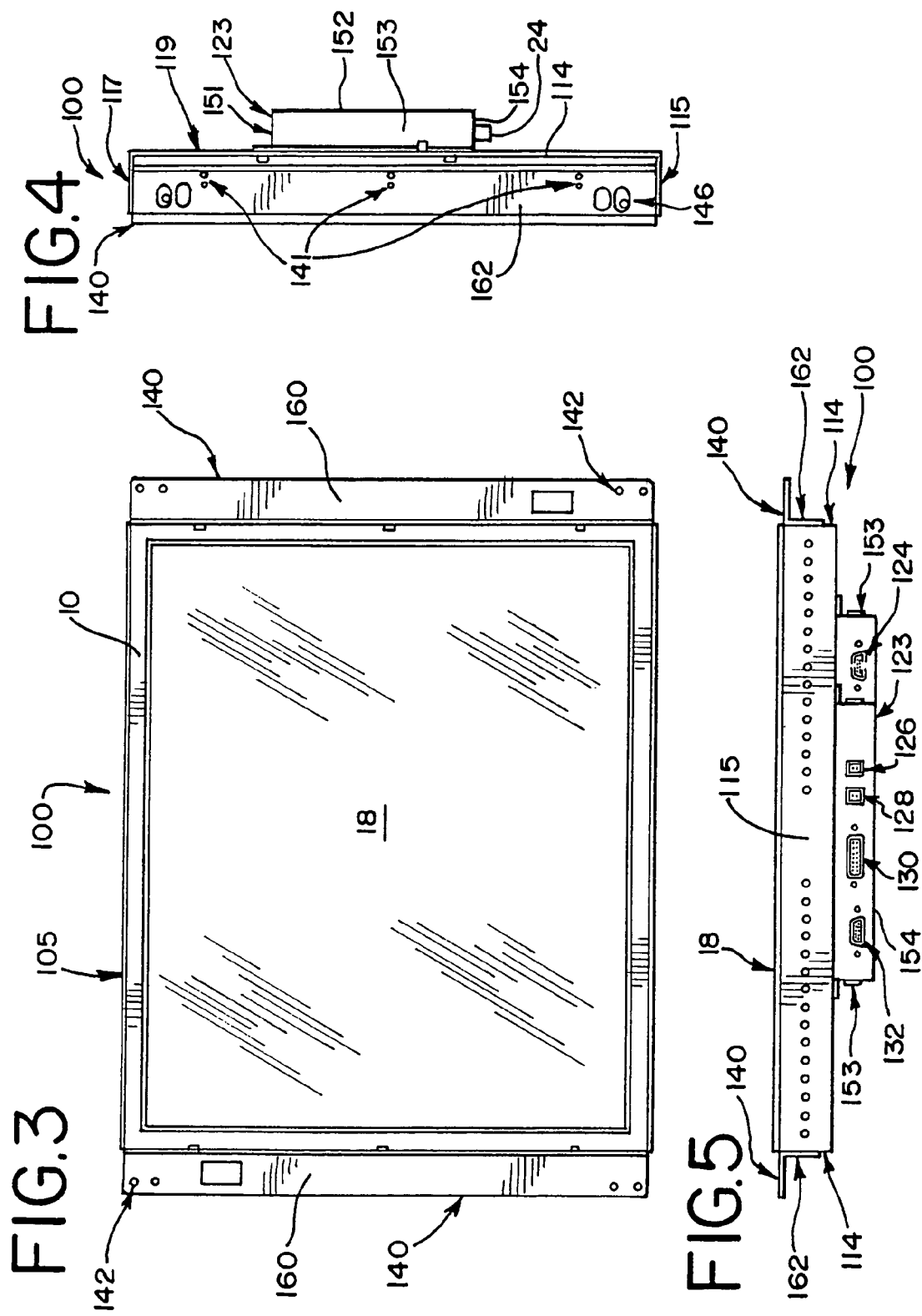

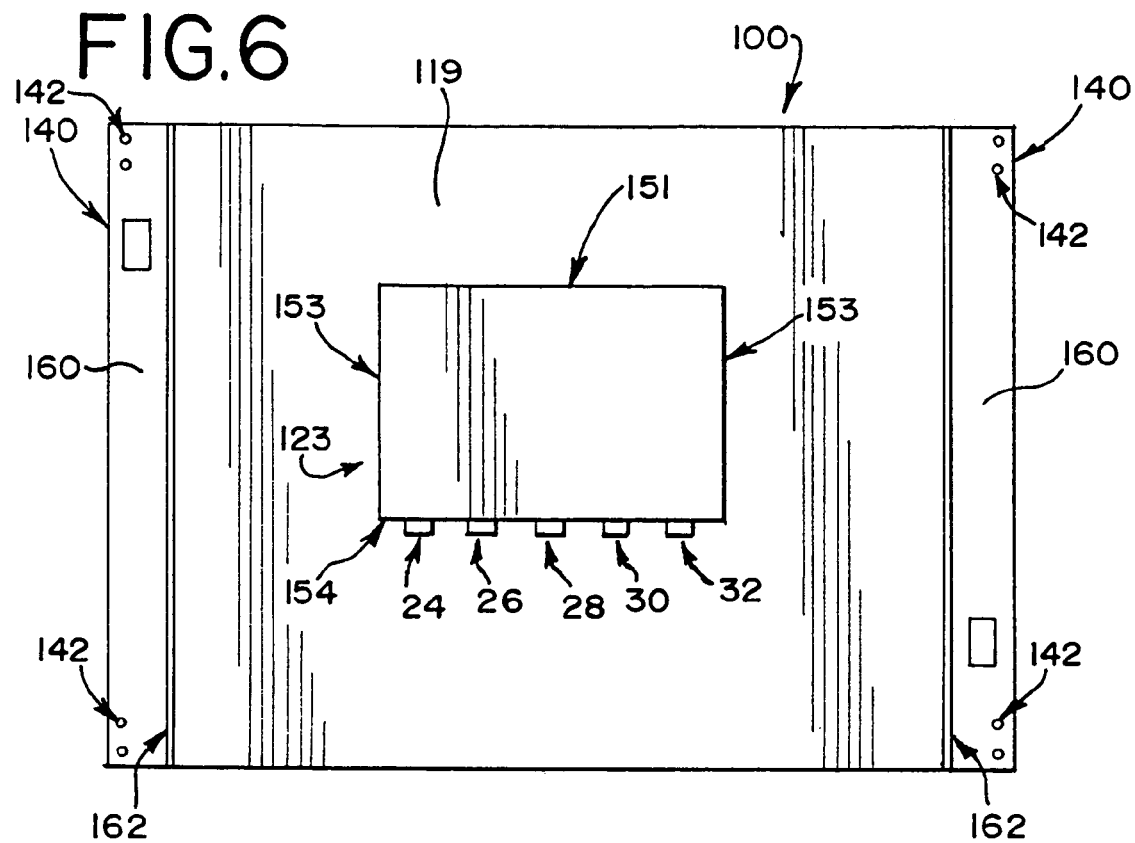
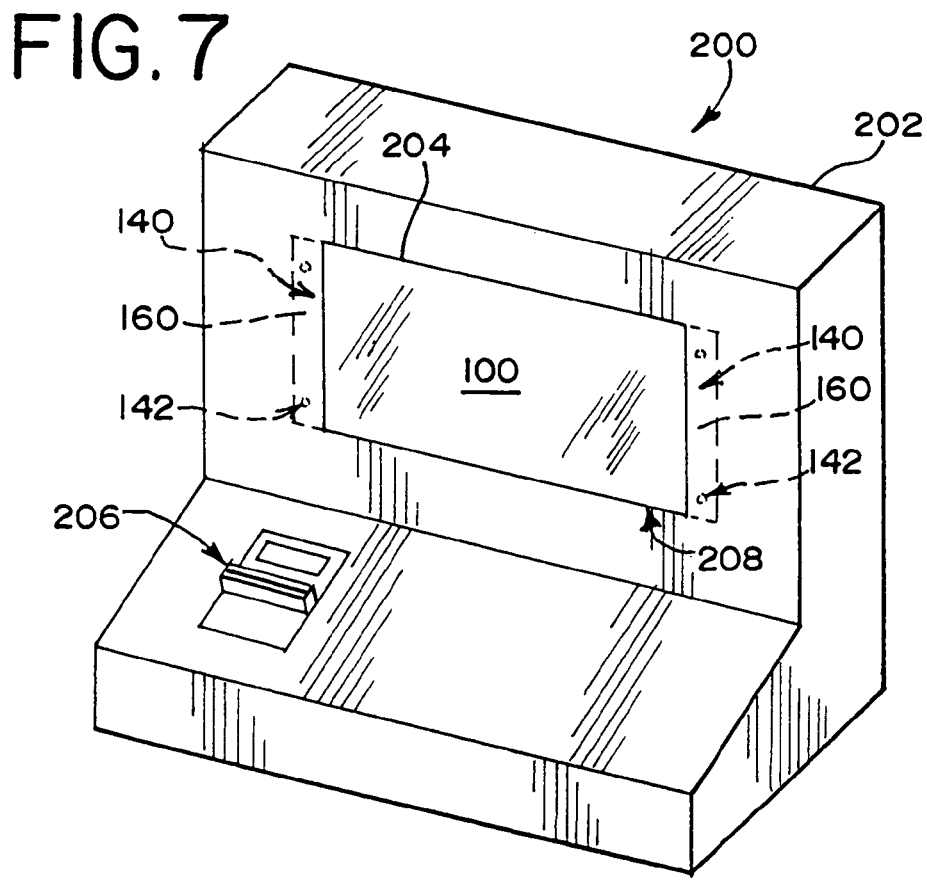

MOUNTABLE FRAME FOR HOLDING FLAT PANEL DISPLAY AND METHODS OF MOUNTING FRAME FOR HOLDING FLAT PANEL DISPLAY

FIELD OF THE INVENTION

The subject invention relates to mountable frames for holding flat panel display screens. The subject invention also relates to methods for mounting frames holding flat panel display screens to facilitate viewing of the screen.

BACKGROUND OF THE INVENTION

Video displays are ubiquitous features in homes, businesses, and public spaces, and are primarily used to provide a visual presentation generated by, for example, personal computers, electronic kiosks, or video games and the like. Video displays are often installed within a housing, particularly if the video display is to be used in connection with, for example, console casino games such as video poker. Until relatively recently, most video displays have been of the cathode ray tube ("CRT") type, which employs an elongated glass vacuum tube wherein the length of the tube is proportional to the surface area of the display screen. Thus, when using a CRT display, the larger the desired display screen, the longer the CRT and the deeper the housing required to hold and protect the CRT. As such, one problem associated with the use of CRTs in consoles is the inordinately large size required of the console to house the CRT. Another problem is the relatively large amount of electricity required to power a CRT.

One way console manufacturers have solved the problems associated with use of CRTs in consoles is by using flat panel displays in place of CRTs. Traditionally used in laptop computers, console manufacturers are increasingly using flat panel displays, such as liquid crystal displays ("LCD"), plasma, and field emission display ("FED"), as video displays within consoles. Flat panel displays have the advantage of providing a suitable video display within a housing of relatively shallow depth, as well as requiring less power than a CRT. Flat panel display technology has made possible the installation of relatively small counter-top gaming machines, which typically further include a touch screen that allows a user to interact with the video display screen instead of using physical keys or buttons.

While the advent of the flat panel display has made it possible for console manufacturers to use a lighter-weight and thinner display within the consoles, mounting the flat panel display within a console housing has been a continuing problem. Most flat panel displays are intentionally designed to have as little extraneous material as possible in order to maintain the typical slim profile of the flat panel display. This quality of the flat panel display, however, renders direct attachment of it to the console difficult due to the small amount of available area on the display housing that may be attached to the console housing. Unfortunately, many or most commercially available flat panel displays do not further include structures that allow them to be easily mounted within a console. Consequently, console manufacturers have encountered difficulty when attempting to mount commercially-available flat panel displays within console housings. There is a demand, therefore, for a device to mount a flat panel display within a housing regardless of the size of the flat panel display. There also exists a demand for a method of installing a flat panel display within a housing regardless of the size of the flat panel display. The present invention satisfies these demands.

SUMMARY OF THE INVENTION

It is a principal objective of the present invention to provide a device for mounting a flat panel video display to an object. The device includes a frame adapted to engageably hold a flat panel video display, wherein the frame includes a back panel having a first edge and a second edge, the first edge being opposite the second edge. A first frame side is attached to the first edge, and a first flange is selectively attached to the first frame side, a surface of the first flange being adapted to engageably attach to an object.

In other embodiments of the invention disclose, a console assembly is provided. The console assembly includes a console for housing a video display, the console having a plurality of walls, at least one of the plurality of console walls including an opening formed therethrough, the opening being sized to display a flat panel video display therethrough. The console assembly further includes a frame assembly disposed proximate the opening. The frame assembly includes a frame adapted to engageably hold a flat panel video display, wherein the frame includes a back panel having a first edge and a second edge, the first edge being opposite the second edge; a first frame side attached to the first edge; and a first flange selectively attached to the first frame side, a surface of the first flange being adapted to engageably attach to an object, a surface of the first flange being adapted to engageably attach to the at least one of the plurality of console walls adjacent the opening.

Advantages of embodiments of the invention include providing console manufacturers with a range of flange size options to choose from in order to provide the best overall fit of the frame and video display assembly within the console in which it is to be housed. This benefit eliminates the need to manufacture numerous models of frames to offer a large spectrum of flange size. Instead, standard frame sizes may be selectively outfitted with the appropriate flange size. Thus, significant savings of time and money are realized by the console manufacturers and the suppliers of frames for flat panel displays.

Another object of the present invention is to provide a method for mounting a flat panel video display within a console. A console is provided for housing a flat panel video display, the console having a plurality of walls, at least one of the console walls including an opening disposed therethrough, the opening having adjacent surfaces and being sized to display a flat panel video display therethrough. A frame adapted to engageably hold the flat panel video display is provided, wherein the frame includes a back panel having a first edge and a second edge, the first edge being opposite the second edge; and a first frame side attached to the first edge. The flat panel video display is disposed within the frame. A plurality of selectively attachable flanges is provided, wherein the plurality of selectively attachable flanges includes at least two flanges of different size, the plurality of flanges further includes a first portion adapted to engage the frame and a second portion adapted to engage the console. A first flange is selected from the plurality of selectively attachable flanges. The first portion of the first flange is attached to the first frame side. The frame is disposed proximate the opening, the second portion of the first flange engaging the console surface adjacent the opening. In addition, the second portion of the first flange is attached to the console surface adjacent the opening.

These and other features and advantages of the present invention will be further understood and appreciated when considered in relation to the following detailed description of embodiments of the invention, taken in conjunction with the drawings, in which:

BRIEF DESCRIPTION OF THE DRAWINGS

FIG. 1 illustrates a perspective view of the front aspect of a flat panel display;

FIG. 2 illustrates a perspective view of the rear aspect of a flat panel display;

FIG. 3 illustrates a front view of a flat panel display frame

FIG. 4 illustrates a side view of a flat panel display frame;

FIG. 5 illustrates a bottom view of a flat panel display frame;

FIG. 6 illustrates a plan view of a back side of console having a video display; and FIG. 7 illustrates a perspective view of a console having a video display.

DETAILED DESCRIPTION OF A PRESENTLY PREFERRED EMBODIMENT

The present invention relates generally to mountable frames that can be adapted to engage a wide range of flat panel video displays regardless of the size of the display. Embodiments of the present invention will find application in all types of housings and consoles that are generally used to house and hold video display screens. Without limiting the application of the scope of the invention, the following will describe certain preferred embodiments used in conjunction with standard LCD-type flat panel display touch-screens suitable for installing within, for example, a counter-top video game console.

A flat panel display 10 is shown in FIGS. 1 and 2. A flat panel display 10 will typically include a thin display screen 18 that employs one of a number of technologies, such as, for example, LCD, plasma, and FED. However, one of ordinary skill in the art will readily recognize that other flat panel display technologies may also be used so long as the display is relatively thin as compared to CRT displays. The display screen 18 may be overlaid with a touch-type device, for example, a touch sensitive screen, or an equivalent device that is operatively connected to electronics within the housing 12 for receiving and processing data received from the touch screen. The display screen 18 and associated electronics (not shown) can be housed within housing 12 or optionally mounted on the back of the housing 12. The housing 12 includes a front 16, a back 17, a top side 15, two opposed sides 14, and a bottom side (not shown). The back 17 of the housing 12 typically further includes vents 20 for intake and exhaust of air used to cool the electronics within the housing.

The back 17 of housing 12 may also include a raised portion to form a junction housing 22, which includes four sides 33 and a face 34. The bottom side (not shown) of junction housing 22 may include ports for data and power. Data and power ports for use with video displays are well known in the art, and typically include interfaces on the exterior side of the housing 12 for connection to external power sources (generally 12 Volt direct current) and data sources, such as a computer. Inside the housing 22, the ports are conductively coupled to the respective components designed to receive the power or data. In this example, port 24 is an input for a touch screen; port 26 is a two-pin 12 Volt DC power socket; port 28 is a standard 12 Volt DC power socket; port 30 is a DVI input; and port 32 is a VGA input.

FIGS. 3-6 show a mountable frame and flat panel display assembly 100. The frame 105 is generally in the form of a shallow pan, which is sized to receive a correspondingly-sized flat panel display 10 within the confines of the pan. The frame may be constructed of any suitably rigid material, such as, without limitation, sheet metal or plastic. The frame further includes a top side 117, a bottom side 115, and two opposed sides 114. The frame 105 also includes a back 119 having a raised portion that includes a top side 151, bottom side 154 and two opposed sides 153, which form the junction housing cover 123. The back 119 and sides 114, 115, and 117 may be formed of a separate back piece 119 that is attached to sides 114, 115, and 117 via fasteners or welds along or near the peripheral edges of the back 119. Alternatively, the back 119 and sides 114, 115, and 117 may be formed of a single unitary piece of sheet metal that is subsequently bent to form the overall pan structure; adjacent sides are then typically attached to one another by fasteners or welds. Flanges 140 are selectively attached to opposed sides 114 respectively.

The junction housing cover 123, when viewed from the interior of the frame 105, is a recess in the back 119 of the frame 105, which is positioned and sized to mount over a corresponding junction housing 22 on the rear side 17 of a flat panel display 10. The junction housing cover 123 includes a top side 151, a bottom side 154, and two opposed sides 153. The bottom side 154 of the junction housing cover 123 may include one or more holes 124, 126, 128, 130, 132 positioned and sized to receive correspondingly positioned and sized ports 24, 26, 28, 30, 32 on the junction housing 22 of the flat panel display 10, and through which holes the ports may project. The junction housing cover 123 may be either integral to the frame 105, or formed of a separate piece that is subsequently secured to the frame 105 by fasteners.

Preferred embodiments of the frame include flanges 140 that are generally L-shaped, each having two longitudinal members 160, 162 approximately perpendicular to one another. However, one of ordinary skill in the art will readily appreciate that other flange configurations, such as, for example, U-shaped flange configurations, may also be used without departing from the scope of the invention. The flanges 140 may be made of the same or different material than the frame 105. The flanges 140 may also be bonded to the frame 105, or attached to the frame by fasteners, such as screws and the like.

In a preferred embodiment, the flanges are selectively attachable to the frame to allow the manufacturer to select from a variety of flange sizes and configurations to attach to the frame in order to accommodate installation of the frame into consoles of various sizes. As such, another embodiment includes a supply of differently-sized and differently-shaped flanges from which a manufacturer may select an appropriate flange for attachment to the frame.

A top surface of longitudinal member 160 of flange 140 has holes 142 disposed therethrough through which fasteners, such as screws or nails, may be driven to secure the flange to another object, such as a console. In addition, a side longitudinal member 162 of flange 140 has holes 141 disposed therethrough. Holes 141 on side longitudinal member 162 correspond to holes (not shown) on the sides 114 of the frame 105. Holes 141 and corresponding holes (not shown) on the sides 114 of the frame 105 are sized to receive fasteners therethrough.

To install a flat panel display 10 within a frame 105, the rear side 17 of the flat panel display 10 is inserted into an appropriately sized frame 105. The junction housing 22 is seated in the interior of junction housing cover 123 such that ports 24, 26, 28, 30, 32 project through corresponding holes 124, 126, 128, 130, 132 on the bottom side 154 of the junction housing cover 123. Or, if the junction housing cover 123 is formed of a separate piece, the flat panel display is first inserted into an appropriately sized frame 105 having an opening disposed in the back thereof through which the junction housing 22 may project, and the junction housing cover 123 is subsequently fitted over the junction housing 22 and attached to the back of the frame 105.

Screws may be driven through holes 141 on the side longitudinal members 162 of the flanges 140, and through corresponding holes (not shown) on the sides 114 of the frame 105, thereby securing the frame 105 to the flanges 140. Screws may be driven through hole 146 and corresponding hole (not shown) on the frame side 114 to secure the frame 105 to the flat panel display 10. In the alternative, the flat panel display 10 may be mounted within the frame 105 by way of a mounting bracket (not shown), in which case it is unnecessary to attach the flat panel display to the frames via fasteners through holes 141.

Once the flat panel display is mounted within the frame and flange assembly, it may be installed within a console. As best shown in FIG. 7, a console 200 typically includes a housing 202 that supports and positions the flat panel display and frame assembly 204, and protects the electronics (not shown) that are operatively connected to the video display 100. If the console is designed for gaming, it may further include a mechanism for receiving payment 206.

The video display 100 may be mounted in the console 200 from the either the console interior or exterior. In either case, the console should optimally include an opening 208 sufficient to receive the flat panel display and frame assembly 204, yet sized to allow longitudinal members 160 of flanges 140 to contact surfaces adjacent the opening 208. If the assembly 204 is being installed from the interior of the console 200, the longitudinal members 160 of flanges 140 will contact interior surfaces (not shown) adjacent the opening 208; likewise, if the assembly is being installed from the exterior of the console 200, the longitudinal members 160 of flanges 140 will contact exterior surfaces adjacent the opening 208. Also, in either case, a selection of flange 140 size and shape is made prior to installation in order to optimize installation of the flat panel display and frame assembly 204 within a particular console 200.

To secure the assembly to the console, fasteners are driven through holes 142 disposed through longitudinal members 160 of the flanges 140, and into the console 200. Thereafter, the flat panel display 100 is operatively connected to power and data inputs via ports 24, 26, 28, 30, and/or 32 that are projecting through holes 124, 126, 128, 130, and/or 132 respectively. To the extent a console 200 is a console having a CRT display and is being retrofitted with a flat panel display and frame assembly 204, the CRT is first removed, then the assembly is installed within the console 200 as described herein.

While endeavoring in the foregoing specification to draw attention to those features of the invention believed to be of particular importance it should be understood that the Applicants claim protection in respect of any patentable feature or combination of features hereinbefore referred to and/or shown in the drawings whether or not particular emphasis has been placed thereon. While the apparatus and method herein disclosed forms a preferred embodiment of this invention, this invention is not limited to that specific apparatus and method, and changes can be made therein without departing from the scope of this invention, which is defined in the appended claims.

What is claimed is:

1. A method of mounting a flat panel video display within a console, comprising:
    providing a console for housing a flat panel video display, the console having a plurality of walls, at least one of the console walls including an opening disposed therethrough, the opening having adjacent surfaces and being sized to display a flat panel video display therethrough;
    providing a frame adapted to engageably hold the flat panel video display, wherein the frame includes:
        a back panel having a first edge and a second edge, the first edge being opposite the second edge; and
        a first frame side attached to the first edge;
    disposing the flat panel video display within the frame;
    providing a plurality of selectively attachable flanges, wherein the plurality of selectively attachable flanges includes at least two flanges of different size and different shape with respect to each other, the plurality of flanges further including a first portion adapted to engage the frame and a second portion adapted to engage the console;
    selecting a first flange from the plurality of selectively attachable flanges;
    attaching the first portion of the first flange to the first frame side;
    disposing the frame proximate the opening, the second portion of the first flange engaging the console surface adjacent the opening; and
    attaching the second portion of the first flange to the console surface adjacent the opening.

2. A device for mounting a flat panel video display to an object, comprising:
    a frame adapted to engageably hold a flat panel video display, wherein the frame includes a back panel having a first edge and a second edge, the first edge being opposite the second edge;
    a first frame side attached to the first edge; and
    a supply of selectively attachable flanges, wherein at least two flanges in the supply are differently sized and differently shaped with respect to each other, a first flange of the supply of flanges selectively attached to the first frame side, a surface of the first flange being adapted to engageably attach to an object.

3. The device of claim 2, further comprising:
    a second frame side attached to the second edge; and
    a second flange of the supply of flanges selectively attached to the second frame side, a surface of the second flange being adapted to engageably attach to an object.

4. The device of claim 3, wherein the back panel includes a third edge and a fourth edge, the third edge being opposite the fourth edge, and further comprising a third frame side attached to the third edge, and a fourth frame side attached to the fourth edge.

5. A console assembly, comprising:
    a console for housing a video display, the console having a plurality of walls, at least one of the plurality of console walls including an opening formed therethrough, the opening being sized to display a flat panel video display therethrough; and
    a frame assembly disposed proximate the opening, the frame assembly including:

a frame adapted to engageably hold a flat panel video display, wherein the frame includes a back panel having a first edge and a second edge, the first edge being opposite the second edge;

a first frame side attached to the first edge;

a supply of selectively attachable flanges, wherein at least two flanges in the supply are differently sized and differently shaped with respect to each other; and a first flange of the supply of flanges selectively attached to the first frame side, a surface of the first flange being adapted to engageably attach to an object, a surface of the first flange being adapted to engageably attach to the at least one of the plurality of console walls adjacent the opening.

6. The device of claim 5, further comprising a second frame side attached to the second edge; and a second flange of the supply of flanges selectively attached to the second frame side, a surface of the second flange being adapted to engageably attach to an object.

7. The device of claim 5, wherein the back panel includes a third edge and a fourth edge, the third edge being opposite the fourth edge, and further comprising a third frame side attached to the third edge, and a fourth frame side attached to the fourth edge.

* * * * *